United States Patent
Dodla

(10) Patent No.: US 9,331,747 B2
(45) Date of Patent: May 3, 2016

(54) ENHANCED DEVICE CONFIGURATION

(71) Applicant: T-Mobile USA, Inc., Bellevue, WA (US)

(72) Inventor: Uday Dodla, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 13/830,406

(22) Filed: Mar. 14, 2013

(65) Prior Publication Data

US 2014/0274014 A1 Sep. 18, 2014

(51) Int. Cl.
*H04B 5/00* (2006.01)

(52) U.S. Cl.
CPC .................. *H04B 5/0031* (2013.01)

(58) Field of Classification Search
CPC ......... H04W 4/02; H04W 4/04; H04B 5/0031
USPC .......... 455/41.2, 552.1, 556.1, 418, 500, 410; 705/41.23, 39, 14.37, 14.38, 14.1, 17
See application file for complete search history.

(56) References Cited

U.S. PATENT DOCUMENTS

| | | | | |
|---|---|---|---|---|
| 7,962,579 | B2 * | 6/2011 | Moore et al. ................. | 709/219 |
| 2005/0060250 | A1 * | 3/2005 | Heller et al. .................... | 705/34 |
| 2007/0190939 | A1 * | 8/2007 | Abel ................... | H04B 5/0031 455/41.2 |
| 2010/0085841 | A1 * | 4/2010 | Lazaridis ............. | G04G 13/026 368/73 |
| 2011/0250866 | A1 * | 10/2011 | Fisher .......................... | 455/410 |
| 2012/0088487 | A1 * | 4/2012 | Khan .......................... | 455/418 |
| 2012/0131570 | A1 * | 5/2012 | Kaikkonen et al. ........... | 717/177 |
| 2013/0095757 | A1 * | 4/2013 | Abdelsamie .......... | H04W 4/001 455/41.1 |
| 2013/0109404 | A1 * | 5/2013 | Husney ...................... | 455/456.1 |
| 2013/0237152 | A1 * | 9/2013 | Taggar et al. ................ | 455/41.1 |
| 2013/0273843 | A1 * | 10/2013 | Shimota et al. .............. | 455/41.1 |
| 2014/0134946 | A1 * | 5/2014 | Testanero ..................... | 455/41.1 |
| 2014/0215029 | A1 * | 7/2014 | Terwilliger ............. | G06F 9/455 709/220 |
| 2014/0357189 | A1 * | 12/2014 | Thuroe ........................ | 455/41.1 |
| 2015/0072663 | A1 * | 3/2015 | Chande .................. | G06Q 10/10 455/414.1 |
| 2015/0081309 | A1 * | 3/2015 | Gazdzinski ........ | G06Q 30/0251 704/275 |

* cited by examiner

*Primary Examiner* — Christopher M Brandt
(74) *Attorney, Agent, or Firm* — Perkins Coie LLP

(57) ABSTRACT

Systems, devices and methods described herein provide or possess functionality that enables providing enhanced device configuration. In one implementation, one or more communication stations are provided. A wireless communication device in close proximity may be configured to communicate with the one or more communication stations. Once a communication session is established between the wireless communication device and the one or more communication stations, configuration particulars, such as configuration data, may be provided to the wireless communication device via the one or more communication stations.

20 Claims, 3 Drawing Sheets

ENHANCED DEVICE CONFIGURATION

BACKGROUND

Mobile wireless communication devices have become increasingly popular. With the increasing popularity, manufacturers of mobile wireless communication devices have enhanced the functionality associated with such communication devices. For example, many modern wireless communication devices, such as smartphones, are capable of storing and executing many different applications. These different applications may include: mapping applications, adult and children's game applications, productivity applications, and the like.

Many wireless communication devices come preloaded with a plethora of different applications. Some consumers may find it useful to experiment with the various applications that come preloaded on the wireless communication devices, while other consumers may prefer to purchase a device that only has a few preloaded applications, or a targeted set of preloaded applications.

BRIEF DESCRIPTION OF THE DRAWINGS

The detailed description is forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Figure 1:
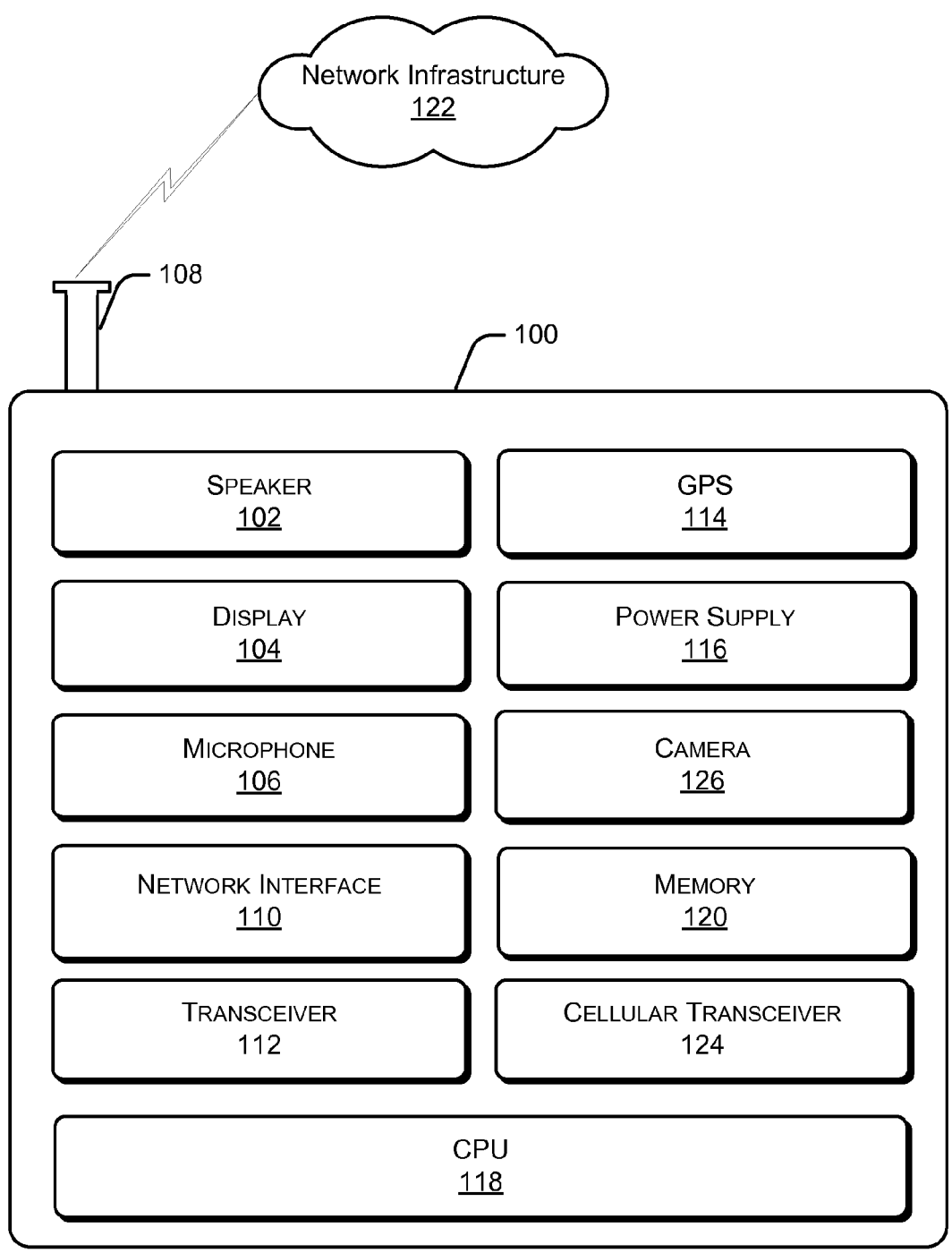
FIG. 1 illustrates components of a mobile device, according to an exemplary implementation.

Systems, devices and methods described herein provide or possess functionality that enables providing enhanced device configuration. In one implementation, one or more communication stations are provided. A wireless communication device in close proximity may be configured to communicate with the one or more communication stations. Once a communication session is established between the wireless communication device and the one or more communication stations, configuration particulars may be provided to the wireless communication device via the one or more communication stations.

In one particular implementation, a brick and mortar location is provided to sell wireless communication devices. A plurality of communication stations may be established in the brick and mortar location. Each of the plurality of communication stations may offer a unique package of one or more configuration settings that may be delivered to wireless communication devices. For example, a first communication station may offer a package of one or more configuration settings including productivity applications found to be useful for general business users. A second communication station may offer a package of one or more configuration settings including entertainment applications found to be useful for a particular age group of users. And a third communication station may offer a package of one or more configuration settings including a limited but diverse set of applications that may be attractive to users desiring to purchase a wireless communication device with a reduced application set.

In one particular implementation, the wireless communication devices and the plurality of communication stations are equipped to communicate using near field communications (NFC). The configuration settings that may be delivered using NFC may include, but are not limited as such, a wireless communication device applications, webpage URLs, manufacturer configuration settings, ring tones, user interface themes, screen backgrounds, wireless operator activation and deactivation settings, wireless device manufacturer factory settings, and wireless communication device unlock and locking settings.

Wireless communication device, mobile device or user device, as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

Mobile devices may communicate with each other and with other elements via a network, for instance, a wireless network, or a wireline network. A network may include broadband wide-area networks such as cellular networks, local-area networks (LAN), Wi-Fi, and personal area networks, such as NFC networks including Bluetooth®. Communication across a network may be packet-based; however, radio and frequency/amplitude modulation networks may enable communication between communication devices using appropriate analog-digital-analog converters and other elements. Communication may be enabled by hardware or mixed hardware and software elements called transceivers. Mobile devices may have more than one transceiver, capable of communicating over different networks. For example, a cellular telephone may include a cellular transceiver for communicating with a cellular base station, a Wi-Fi transceiver for communicating with a Wi-Fi network, and a Bluetooth® transceiver for communicating with a Bluetooth® device. A Wi-Fi network is accessible via access points such as wireless routers, etc., that communicate with the Wi-Fi transceiver to send and receive data. The Wi-Fi network may further be connected to the internet or other packet-based networks. The bandwidth of a network connection or an access point is a measure of the rate of data transfer, and can be expressed as a quantity of data transferred per unit of time.

A network typically includes a plurality of elements that host logic or intelligence for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server may include several network elements, including other servers, and can be logically situation anywhere on a service provider's network, such as the back-end of a cellular network. A server hosts or is in communication with a database hosting an account for a user of a mobile device. The user account includes several attributes for a particular user, including a unique identifier of the mobile device(s) owned by the user, relationships with other users, application usage, location, personal settings, business rules, bank accounts, and other information. A server may communicate with other servers on different networks to update a user account.

FIG. 1 illustrates components of a mobile device 100, according to an exemplary embodiment. The mobile device 100 may include a speaker 102, a display 104, a microphone 106, and an antenna 108. The mobile device 100 may further include a network interface 110, a transceiver 112, a Global Positioning System (GPS) receiver 114, a power supply 116, a central processing unit (CPU) 118, and a memory 120. Furthermore, the mobile device 100 may include a cellular transceiver 124 and a camera 126. The camera 126, or what may be referred to as a general image capturing device, may capture images, obtain images from video captured by the camera 126, and capture video.

The transceiver 112 may provide NFC functionality. NFC is a short-range wireless connectivity technology that may provide digital communication between devices by touching them together or placing them within a close proximity to each other (e.g., approximately two inches). NFC technology may be incorporated into stand-alone, discrete devices, or on the other hand may be incorporated into existing devices, which may be referred to as NFC communications enabled devices. For example, devices that do not have built-in NFC technology may be outfitted with an NFC sleeve, which provides NFC functionality. The transceiver 112 may also provide other wireless communication functionality. For example, the transceiver 112 may be enabled to provide Bluetooth and/or Wi-Fi communication capabilities. Furthermore, the transceiver 112 may be capable of interfacing with an NFC sleeve that is coupled to the mobile device 100.

The speaker 102 provides an audio output for the mobile device 100. The display 104 may be an LCD or LED or other type of display on which a user can view selections, images, video, numbers, letters, etc. The display 104 may also be a touchscreen, thereby being used as an input device. In embodiments not using a touchscreen, a keypad is typically used as an input device, for instance, to type a phone number or a message. Such a keypad may be a numerical keypad, a QWERTY keyboard, etc. The microphone 106 allows the user to verbally communicate with others using mobile device 100. The antenna 108 is a transducer designed to transmit or receive electromagnetic waves to and from a network 122. In conjunction with the antenna 108, the network interface 110 allows the mobile device 100 to wirelessly communicate with network 122, such as a cellular network and/or an access point, or with other wireless devices across the network 122. The network 122 may include, but is not limited as such, operator equipment necessary to enable mobile devices to communicate using cellular communication technology and protocols. Furthermore, the network 122 may include servers, servers that include databases, one or more processors that execute instructions stored in memory and/or storage, and the like. Furthermore, the network 122 may include mobile devices similar to the mobile device 100. Therefore, the mobile device 100 may be in direct or indirect communication with one or more such mobile devices included in the network 122.

The network interface 110 may be a cellular transceiver, wireless transceiver, etc., and may include combinations of transceivers to communicate with assorted wireless networks. Alternatively, the network interface 110 may couple one or more transceivers of the mobile device 100 to one or more communication networks. The transceiver 112 enables mobile device 100 to wirelessly communicate over short ranges with a Wi-Fi access point and NFC devices, and through the access point, to a packet-based network such as the Internet, and other devices on the internet. The GPS transceiver 114 enables a determination of a location of mobile device 100, by receiving signals from a GPS satellite. In addition to these signals, network interface 110 can receive assistance data from an A-GPS server on the cellular network, thereby enabling GPS receiver 114 to get a faster fix on a satellite signal. The power supply 116 provides power to each of the components of mobile device 100, and can include a battery, as well as an interface to an external power supply. The CPU 118 controls components of mobile device 100 according to instructions stored in the memory 120.

The memory 120 may be any computer readable medium, such as RAM, ROM, etc. The memory 120 may store intelligence, such as computer readable instructions, in addition to logic for operating the components of mobile device 100. The memory 120 further may store a database or have logically known assessable memory locations including media, such as images, video, files, and the like. The media stored in the memory 120 may have been captured by the camera 126.

Figure 2:
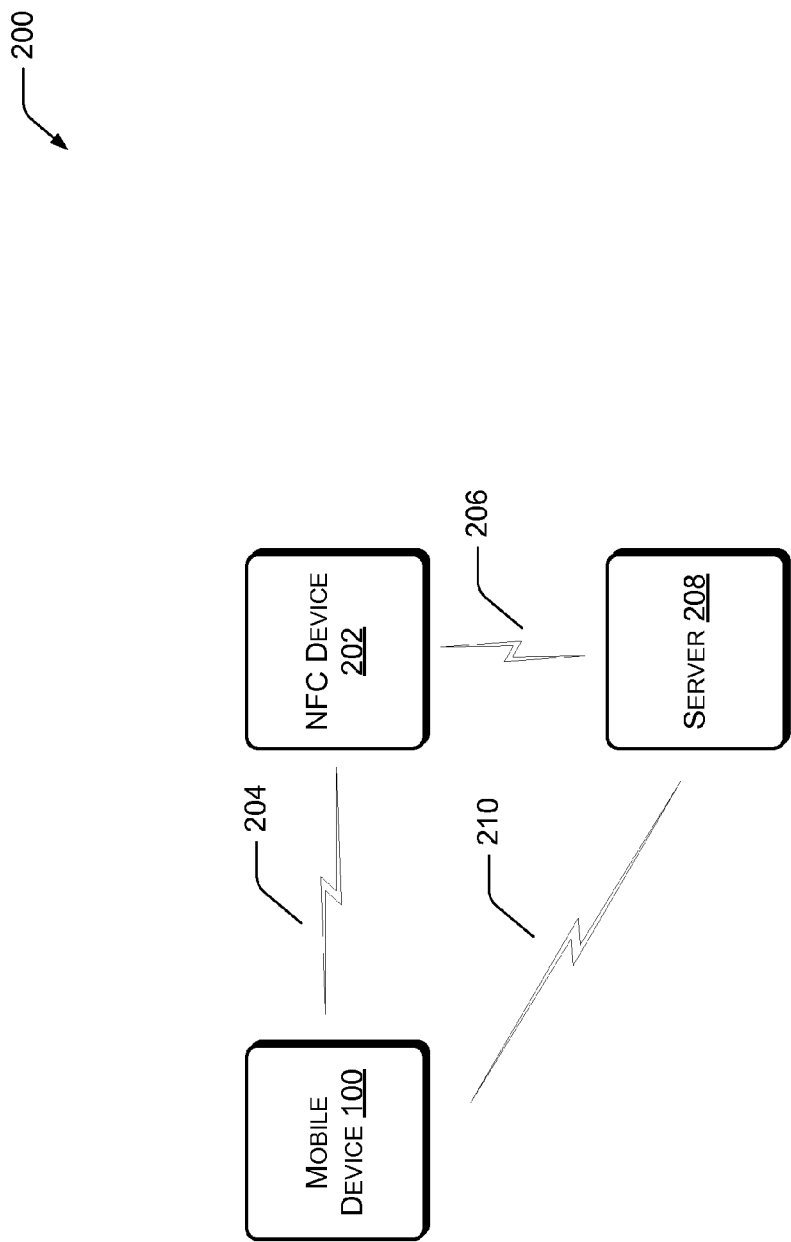
FIG. 2 illustrates an exemplary device configuration environment.

FIG. 2 illustrates an exemplary device configuration environment. As is illustrated, the mobile device 100 may establish a short range communication session 204 (e.g., NFC) with an NFC device 202. The NFC device 202 may be coupled wirelessly and/or via wireline 206 to a server 208. The server 208 may provide configuration data and information to the NFC device 202. The configuration data and information may be delivered to the mobile device 100 over the short range communication session 204. In an alternative implementation, the NFC device 202 may include a storage that stores configuration data and information that may be delivered to the mobile device 100 by way of the short range communication session 204. The NFC device 202 may have a transceiver that enables establishing the short range communication session 204. Furthermore, the NFC device 202 may include one or more processors that may execute instructions stored in a storage of the NFC device 202 in order to enable delivery of the configuration data to the mobile device 100.

The NFC device 202 may provide to the mobile device 100 a package of one or more configuration settings including productivity applications found to be useful for general business users. Alternatively, the NFC device 202 may provide to the mobile device 100 a package of one or more configuration settings including entertainment applications found to be useful for a particular age group of users. Alternatively, the NFC device 202 may provide to the mobile device 100 a package of one or more configuration settings including a limited but diverse set of applications that may be attractive to users desiring to purchase a wireless communication device with a reduced application set.

In an alternative implementation, there may be a plurality of NFC devices 202. The plurality of NFC devices 202 may be located in a brick-and-mortar establishment, such as a location that sells mobile communication devices. Alternatively, the brick-and-mortar establishment may be a factory or manufacturer location that produces mobile devices. Each of the plurality of NFC devices 202 may be enabled to provide a unique package of configuration settings. Again, configuration settings may include one or more executable applications, ring tones, mobile device themes, background graphics, network operator mobile device configuration particulars, account identity, unique user identity information, and URLs. Furthermore, each of the plurality of NFC devices 202 may be enabled to provide account information to a mobile device. This account information may be stored in the server 208 or provided by the server 208 to enable a network operator to properly bill for services provided to (e.g., configuration settings) an operator of an associated mobile device.

The foregoing example illustrates that the mobile device 100 may be provisioned directly by the NFC device 202, using configuration settings stored in the NFC device 202 and/or configuration settings stored in the server 208. In an alternative implementation, once the short range communication session 204 is established between the mobile device 100 and the NFC device 202, the NFC device 202 may provide authorization data to the mobile device 100. Such authorization data may enable the mobile device 100 to communicate directly, via a wireless and/or wireline communication session 210, to obtain configuration settings directly from the server 208. For example, the authorization data may enable the mobile device 100 to retrieve configuration settings for configuring the mobile device 100. Furthermore, the authorization data may enable the server 208 to establish and collect necessary account information that may be used by a network operator to establish a commerce relationship with a user of the mobile device 100.

Figure 3:
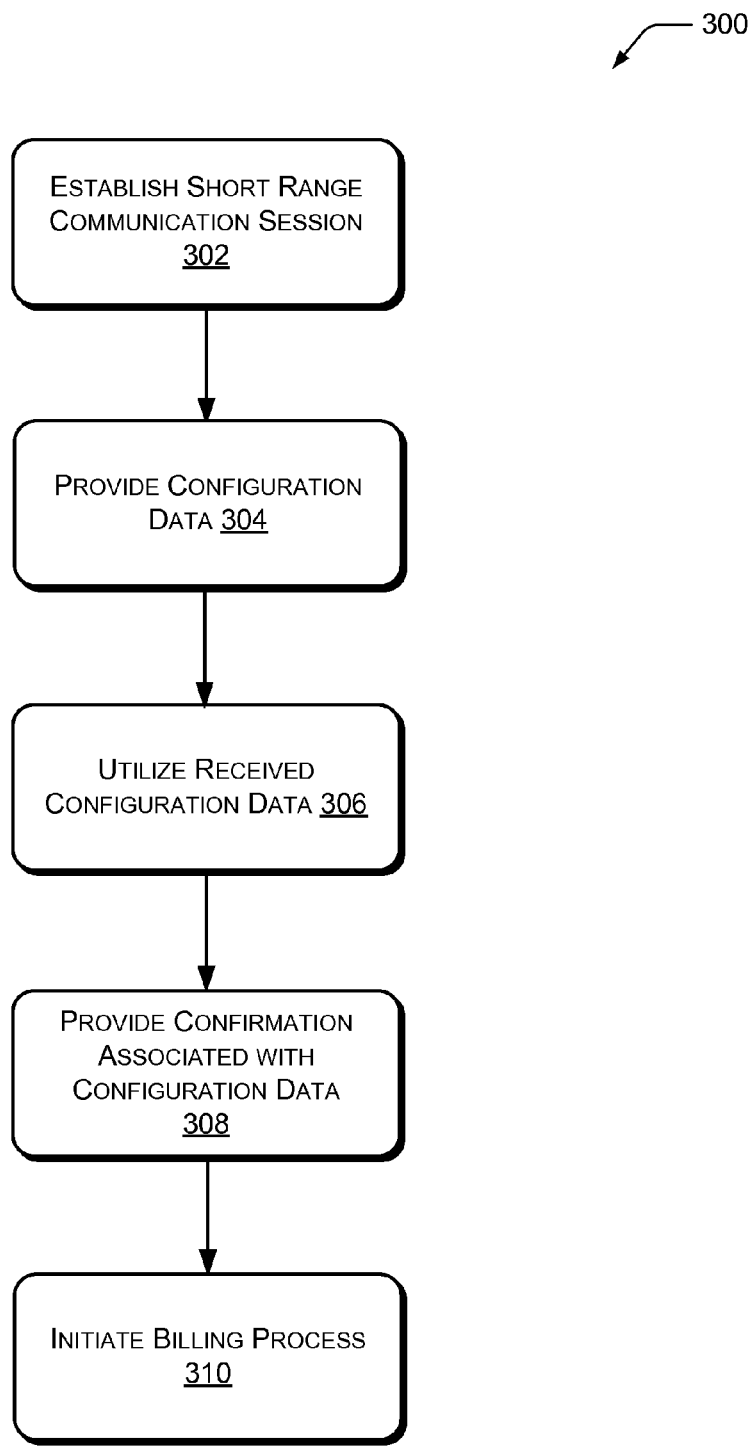
FIG. 3 is a flow diagram illustrating an example process for configuring a mobile device according to an implementation.

FIG. 3 is a flow diagram illustrating an example process 300 for configuring a mobile device according to an implementation. The process 300 may reference elements illustrated in FIGS. 1-2. However, generally, the disclosed process 300 may be implemented by a device, a system of devices, computer-readable medium including computer-executable instructions that, when executed, perform the process 300, and the like. The process 300 may be executed by a mobile device. The process 300 may be executed by an NFC device. Moreover, the process may be executed by a general computing device.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable materials, or combinations thereof, without departing from the scope of the subject matter described herein.

The process may begin at block 302 where an NFC enabled communication device, such as the NFC device 202, establishes a short range communication session with a mobile device, such as the mobile device 100. In various embodiments, the short range communication session may be generated by the transmission of a radio frequency ("RF") signal which generates a magnetic field. NFC enabled devices may inductively couple with the magnetic field and modulate a signal to be transmitted, the signal containing, for example, configuration data.

At block 304, the NFC communication enabled device may provide configuration data to the mobile device. In various embodiments, the configuration data may be configuration data including a unique user identity, an account identity, an application identity, URLs, security information, a predefined set of applications, themes, images, icons, and the like. In various embodiments, the configuration data may be directly associated with a service requested by a mobile device. Additionally, the configuration data may be detected, received, and processed by configuration software installed on the mobile device. The NFC communication enabled device may have stored therein some or all of the configuration data, and/or the NFC communication enabled device may retrieve configuration data from a remote server, such as the server 208.

Once the requested data has been received, the mobile device may install, configure, or utilize the received configuration data at block 306. In various embodiments, configuration software on the mobile device may perform a verification on the received configuration data. In other embodiments, the configuration software on the mobile device may install or configure the configuration data in a particular storage area of the mobile device. The particular storage area may be isolated from a main storage area wherein a majority of the necessary firmware, software, and OS to operate the mobile device are installed.

At block 308, the mobile device may confirm back to the NFC communication enabled device that the configuration data was properly receive and/or installed. At block 310, the NFC communication enabled device may initiate a process to bill a user of the mobile device for the received configuration data.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

The exemplary processes discussed herein may be implemented with hardware, software, firmware, or any combination thereof. In the context of software/firmware, instructions stored on one or more processor-readable storage media that, when executed by one or more processors, may perform the recited operations. The operations of the exemplary processes may be rendered in virtually any programming language or environment including (by way of example and not limitation): C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

Processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

What is claimed:

1. A method, comprising:
   determining a device is within range of one or more of a plurality of near field communication devices,
      wherein each of the plurality of near field communication devices offers a unique device configuration data set that may be utilized to customize the device;
   establishing a near field communication session between the device and at least one of the plurality of near field communication devices; and
   automatically sending predetermined device configuration data from one of the plurality of near field communication devices to the device over the near field communication session,
      wherein the predetermined device configuration data includes one or more applications executable, after installation, by the device.

2. The method according to claim 1, wherein the act of sending predetermined device configuration data includes retrieving the predetermined device configuration data from a storage associated with the near field communication device performing the sending act.

3. The method according to claim 1, wherein the act of sending predetermined device configuration data includes receiving the predetermined device configuration data from a remote server coupled to the near field communication device performing the sending act.

4. The method according to claim 1, further comprising receiving a confirmation that the predetermined device configuration data was received by the device.

5. The method according to claim 1, further comprising initiating a billing process in response to the sending of the predetermined device configuration data to the device.

6. The method according to claim 1, wherein a first near field communication device offers a first unique device configuration data set that includes productivity applications and a second near field communication device offers a second unique device configuration data set that includes entertainment applications.

7. The method according to claim 1, wherein automatically sending predetermined device configuration data from one of the plurality of near field communication devices to the device over the near field communication session includes transmitting authorization data that allows the device to automatically retrieve predetermined device configuration data from a server.

8. A method, comprising:
   determining a device is within range of one of a plurality of near field communication stations,
      wherein each of the plurality of near field communication stations offers a different device configuration data set that may be utilized to customize the device in a different way,
      wherein a first near field communication device offers a first device configuration data set that includes productivity applications, and
      wherein a second near field communication device offers a second device configuration data set that includes entertainment applications;
   establishing a near field communication session with the device; and
   automatically sending predetermined device configuration data to the device over the near field communication session,
      wherein the predetermined device configuration data includes one or more entertainment or productivity applications executable, after installation, by the device.

9. The method according to claim 8, wherein the predetermined device configuration data also includes at least one of a background image, ring tones, mobile device themes, network operator mobile device configuration particulars, account identity, unique user identity information, or URLs.

10. The method according to claim 8, wherein the act of sending predetermined device configuration data includes retrieving the predetermined device configuration data from a storage associated with a near field communication device performing the sending act.

11. The method according to claim 8, wherein the act of sending predetermined device configuration data includes receiving the predetermined device configuration data from a remote server coupled to a near field communication device performing the sending act.

12. The method according to claim 8, further comprising receiving a confirmation that the predetermined device configuration data was received by the device.

13. The method according to claim 8, further comprising initiating a billing process in response to the sending of the predetermined device configuration data to the device.

14. An apparatus, comprising:
    at least one storage including processor executable instructions; and
    a processor coupled to the at least one storage, the processor configured to execute the processor executable instructions to
       determine a device is within range;
       establish a near field communication session with the device; and
       automatically send predetermined device configuration data to the device over the near field communication session,
          wherein the predetermined device configuration data is unique to the apparatus, and
          wherein the predetermined device configuration data includes one or more applications executable, after installation, by the device.

15. The apparatus according to claim 14, wherein the apparatus is a plurality of apparatuses each having different predetermined device configuration data from the other of the plurality of apparatuses, the plurality of apparatuses provided in a brick and mortar location offering for sale mobile devices, or a brick and mortar location for manufacturing mobile devices.

16. The apparatus according to claim 14, wherein the predetermined device configuration data includes at least one of a background image, ring tones, mobile device themes, network operator mobile device configuration particulars, account identity, unique user identity information, or URLs.

17. The apparatus according to claim 14, wherein the act of to send predetermined device configuration data includes retrieving the predetermined device configuration data from a storage associated with a near field communication device performing the sending of the predetermined device configuration data.

18. The apparatus according to claim 14, wherein the act of to send predetermined device configuration data includes receiving the predetermined device configuration data from a remote server coupled to a near field communication device performing the sending of the predetermined device configuration data.

19. The apparatus according to claim 14, wherein processor executable instructions are further to confirm that the predetermined device configuration data was received by the device.

20. The apparatus according to claim 14, wherein processor executable instructions are further to initiate a billing process in response to sending the predetermined device configuration data to the device.

* * * * *